United States Patent [19]

Baker

[11] Patent Number: 5,485,593
[45] Date of Patent: Jan. 16, 1996

[54] DATA STRUCTURE ACCESS CONTROL CIRCUIT AND METHOD UTILIZING TAG BITS INDICATING ADDRESS MATCH AND MEMORY FULLNESS CONDITIONS

[75] Inventor: Brian N. Baker, Kanata, Canada

[73] Assignee: Northern Telecom Limited, Montreal, Canada

[21] Appl. No.: 205,333

[22] Filed: Mar. 3, 1994

Related U.S. Application Data

[63] Continuation of Ser. No. 680,448, Apr. 4, 1991, abandoned.

[51] Int. Cl.[6] .................................................. G06F 13/18
[52] U.S. Cl. ................... 395/200.08; 395/650; 395/474; 364/DIG. 1
[58] Field of Search ................................ 395/425, 650, 395/725; 364/DIG. 1, 281.6, 281.7, 281.8, 967.4, 967.5; 365/230.03, 230.08

[56] References Cited

U.S. PATENT DOCUMENTS

| | | | |
|---|---|---|---|
| 4,414,624 | 11/1983 | Summer, Jr. et al. | 395/650 |
| 4,811,216 | 3/1989 | Bishop et al. | 395/425 |
| 4,910,656 | 3/1990 | Scales, III et al. | 395/425 |
| 4,951,193 | 8/1990 | Muramatsu et al. | 395/650 |
| 4,985,831 | 1/1991 | Dulong et al. | 395/650 |
| 5,060,144 | 11/1991 | Sipple et al. | 395/650 |

FOREIGN PATENT DOCUMENTS

| | | |
|---|---|---|
| 1083375 | 9/1967 | United Kingdom . |
| 1259743 | 1/1972 | United Kingdom . |

OTHER PUBLICATIONS

IBM Technical Disclosure Bulletin, vol. 28, No. 4 Sep. 1985 Dynamic Storage Pool Manager: pp. 1684–1686.
IBM Systems Journal vol. 23, No. 1, 1984 Analysis of Free Storage Algorithms Revisited by Bozman et al. pp. 44–64.
IBM Technical Disclosure Bulletin vol. 18 No. 7 Dec. 1975 Main Storage Allocation Method by Sawyer et al pp. 2321–2323.
ATT the Design fo the UNIX Operating System by M. J. Bach ©1986 See Chapter 9 Prentice–Hill, Inc., Englewood Cliffs, N.J.

*Primary Examiner*—Glenn Gossage
*Assistant Examiner*—James Peikari
*Attorney, Agent, or Firm*—F. P. Turpin; Yoshiharu Toyooka

[57] ABSTRACT

A method and circuit utilizing first and second tag bits for granting access to a block of memory in a multiprocessor system having a shared memory are provided. When a memory request for exclusive access to a block of memory is granted, the starting address for that block of memory is placed in a register bank, thereby opening a semaphore. The starting address of a memory block of a subsequent memory access request is compared with the starting addresses corresponding to open semaphores within the register bank and access is denied to the requested block of memory if a match is found. The starting address associated with a request which is denied access is placed in a temporary buffer and the request is later granted access after the corresponding open semaphore becomes closed. A request which is granted memory access to a memory block which results in an open semaphore, has exclusive access to that block of memory until the semaphore is closed.

3 Claims, 4 Drawing Sheets

5,485,593

DATA STRUCTURE ACCESS CONTROL CIRCUIT AND METHOD UTILIZING TAG BITS INDICATING ADDRESS MATCH AND MEMORY FULLNESS CONDITIONS

This application is a continuation of application Ser. No. 07/680,448, filed Apr. 4, 1991, now abandoned.

FIELD OF THE INVENTION

The invention relates generally to memory access control of a shared memory of a telecommunications system and more specifically to a method and circuit for implementing semaphores in a shared memory system.

BACKGROUND OF THE INVENTION

Telecommunications systems often include a pair of duplex processors running in synchronous operation. This arrangement provides a redundant system wherein a failure of one of the processors typically results in the other of the processors taking over all processing operations while the faulty processor is taken out of service and replaced.

It is common for systems to depend upon the execution of sizeable programs consisting of a large amount of object code for their operation. The object code is related to both call processing, and to the maintenance of the telecommunications system itself. These programs are usually written in a high-level procedural language which is subsequently compiled into low level executable object code. It is not uncommon for programs such as those related to telecommunications systems to be comprised of several million lines of code which may take teams of programmers years to develop.

In a uniprocessor system or in a synchronous duplex processor system, instructions are executed one at a time, in a sequential manner. However, in such systems, it has been found advantageous to implement a "multitasking" scheme whereby tasks comprising numerous lines of code are executed on a scheduled basis. One task may be swapped out while several others are sequentially swapped in and out before the first one is completed. A task, often termed a "process", may utilize a number of subroutines each made up of a number of lines of code. When a task is swapped in, the processor executes the task for a predetermined amount of time, until a scheduler swaps out that task and swaps in another task. The term swap is used here to mean exchange. Instances do occur however, when a task is reading and writing data to a particular memory location while other tasks require reading access to that same memory location. In such a case it is essential that some exclusionary mechanism be employed to prevent access to memory until the previous task is complete. In an event where it is essential for a particular procedure within a task to complete, or for the task itself to complete, the processor executing that procedure or task may be forced into an uninterruptable state until the procedure or task is complete. This uninterruptable state is frequently achieved by the assertion of a global locking mechanism during which the task being performed has exclusive access to the processor and its associated memory banks while the swapping in of other tasks is temporarily halted. Such a global locking scheme has been found to be adequate for a uniprocessor system since the processor is not held up in a waiting state.

Whenever a uniprocessor data handling system is replaced with a multiprocessor system it is desirable to run code already developed for the uniprocessor system on the multiprocessor system. However, in a multiprocessor system wherein a task is being executed by a first processor while a global lock condition is asserted, other processors are locked out of the shared memory. These other processors have to wait until global lock is de-asserted before memory can be accessed, resulting in the other processors being idle for that period of time. This problem may be solved by the implementation of a mechanism which provides the capability of locking and unlocking discrete portions of the shared memory.

It is therefore an object of the invention to provide a method of managing access to a readable, alterable, shared memory in a multiprocessor based system. It is a further object to provide a method of contention avoidance between processors attempting to access the same memory space.

SUMMARY OF THE INVENTION

In accordance with the invention there is provided a method of managing a shared memory in a telecommunications system having a plurality of processors each capable of accessing discrete data structures within the shared memory and for controlling access by one of the processors to any one of the data structures within the memory, the method comprising the steps of:
(a) storing a plurality of addresses in a memory bank each address being a starting address of a data structure and corresponding to an open semaphore;
(b) comparing the starting address of a requested data structure with the addresses in the memory bank to determine the presence of an open semaphore for the requested data structure;
(c) granting memory access to the requested data structure if the starting address of the requested data structure is not in the memory bank and if a semaphore is not required;
(d) if the starting address of the data structure is not in the memory bank, opening a semaphore storing the starting address of the requested data structure into the memory bank if a semaphore is required; and
(e) if the starting address of a requested data structure matches an open semaphore in the memory bank, temporarily storing the starting address of the requested data structure until the corresponding open semaphore becomes closed at which point access to the requested data structure is granted.

From another aspect of the invention in a telecommunications system having a plurality of processors each capable of accessing a shared memory containing discrete data structures, there is provided a method of controlling access by one of said processors to any one of the data structures within the shared memory if the data structure is not being accessed by another of the processors, the method comprising the steps of:
(a) comparing the starting address of the requested data structure with a plurality of starting addresses stored in a memory, each of the starting addresses being associated with a respective data structure of the shared memory;
(b) granting memory access to the requested data structure and storing the starting address of the requested data structure in the bank of addresses if the starting address of the requested data structure does not match any of the starting addresses in the bank of addresses; and
(c) repeating step (a) if memory access was not granted in step (b).

From another aspect, the invention provides, in a telecommunications system having a plurality of processors each capable of accessing discrete data structures within a shared memory, a circuit for managing the shared memory and for controlling memory access by one of the processors to a requested data structure within the memory, comprising:

a memory bank for storing a plurality of addresses wherein each address is a starting address of a data structure and corresponds to an open semaphore;

means for comparing the starting address of a requested data structure with the addresses in the memory bank of addresses to determine the presence of an open semaphore for the requested data structure;

storage means for temporarily storing the starting address of the requested data structure until a corresponding open semaphore stored in the memory bank becomes closed; and logic circuit for granting memory access to the requested data structure if the starting address of the requested data structure was not in the bank of addresses, and for granting memory access to the requested data structure upon a corresponding open semaphore becoming closed.

BRIEF DESCRIPTION OF THE DRAWINGS

An embodiment of the invention will be described in conjunction with the accompanying drawings in which:

In FIG. 1, M processors 14 are shown each coupled to L shared memory modules 12 by an L×M switch 13 and to N link handlers 16 via an (L+M)×M switch 15. The link handlers 16 provide interfacing between the processors 14 and transmission links to other facilities.

As shown in FIG. 2, each memory module 12 comprises a memory 17 coupled to memory access control circuitry 18 which includes a semaphore controller 20, a memory controller 21, and input and output queues 22 and 23 respectively. Each input queue 22 and output queue 23 includes a first-in first-out (FIFO) buffer for queueing and storing memory requests and interface circuitry for providing the transmission and reception of memory requests to and from the processors 14.

The semaphore controller 20 provides a mechanism for opening semaphores and releasing semaphores. In the instance that a processor requests access to a data structure stored in a shared memory module 12, a semaphore may be opened thus giving exclusive access to the data structure. Any request from one of the other processors for the same data structure having an associated open semaphore is considered to be in conflict and is held in abeyance. When the semaphore is released, another request for that data structure may be granted.

The memory controller 21 executes memory-read and memory-write commands received from the semaphore controller. In the case of a memory-read command, the memory controller reads the requested data and transmits the data read back to the processor originating the read request.

Figure 1:
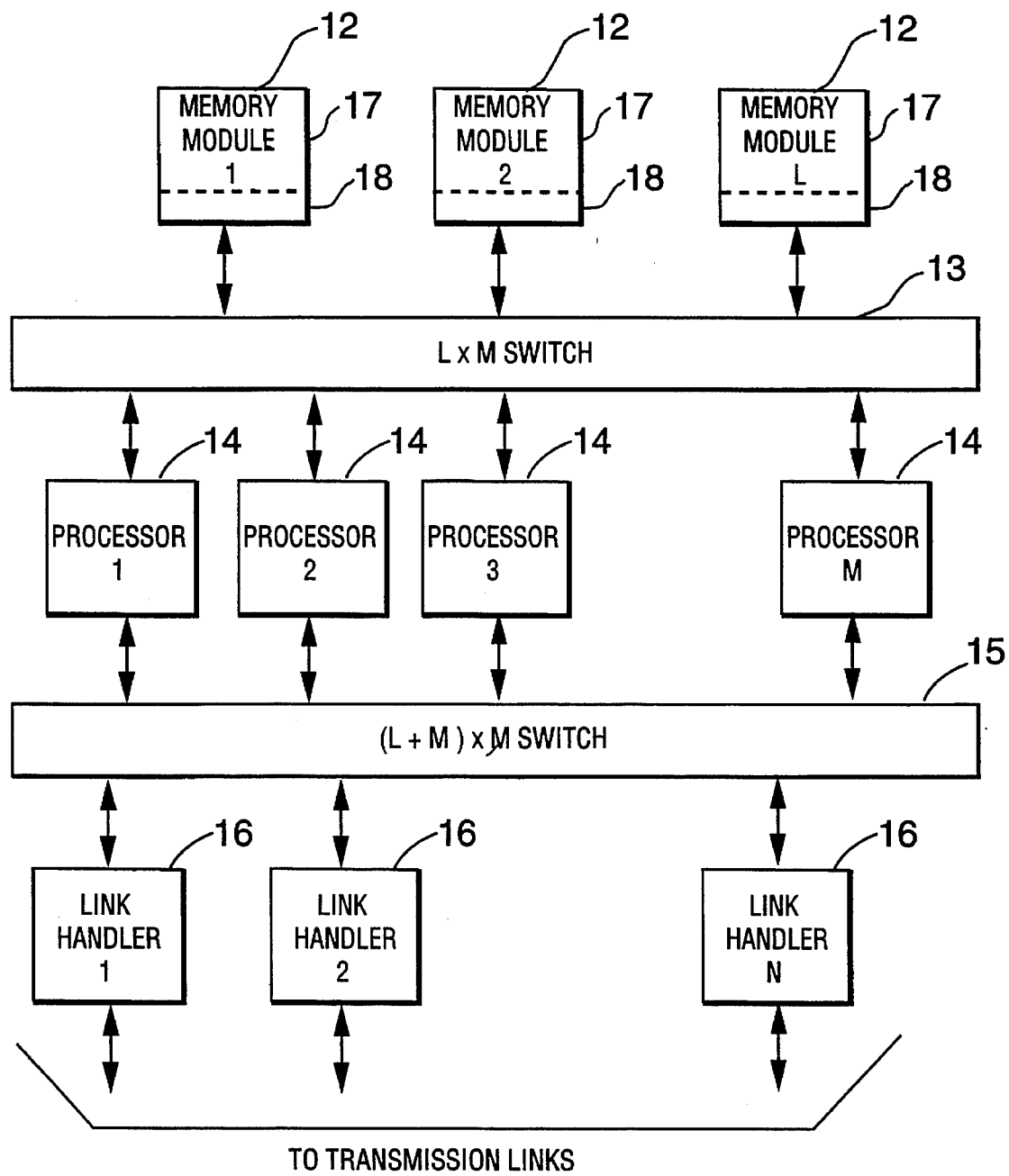
FIG. 1 is a block diagram of a multiprocessor system having a shared memory in accordance with the invention.
Figure 2:
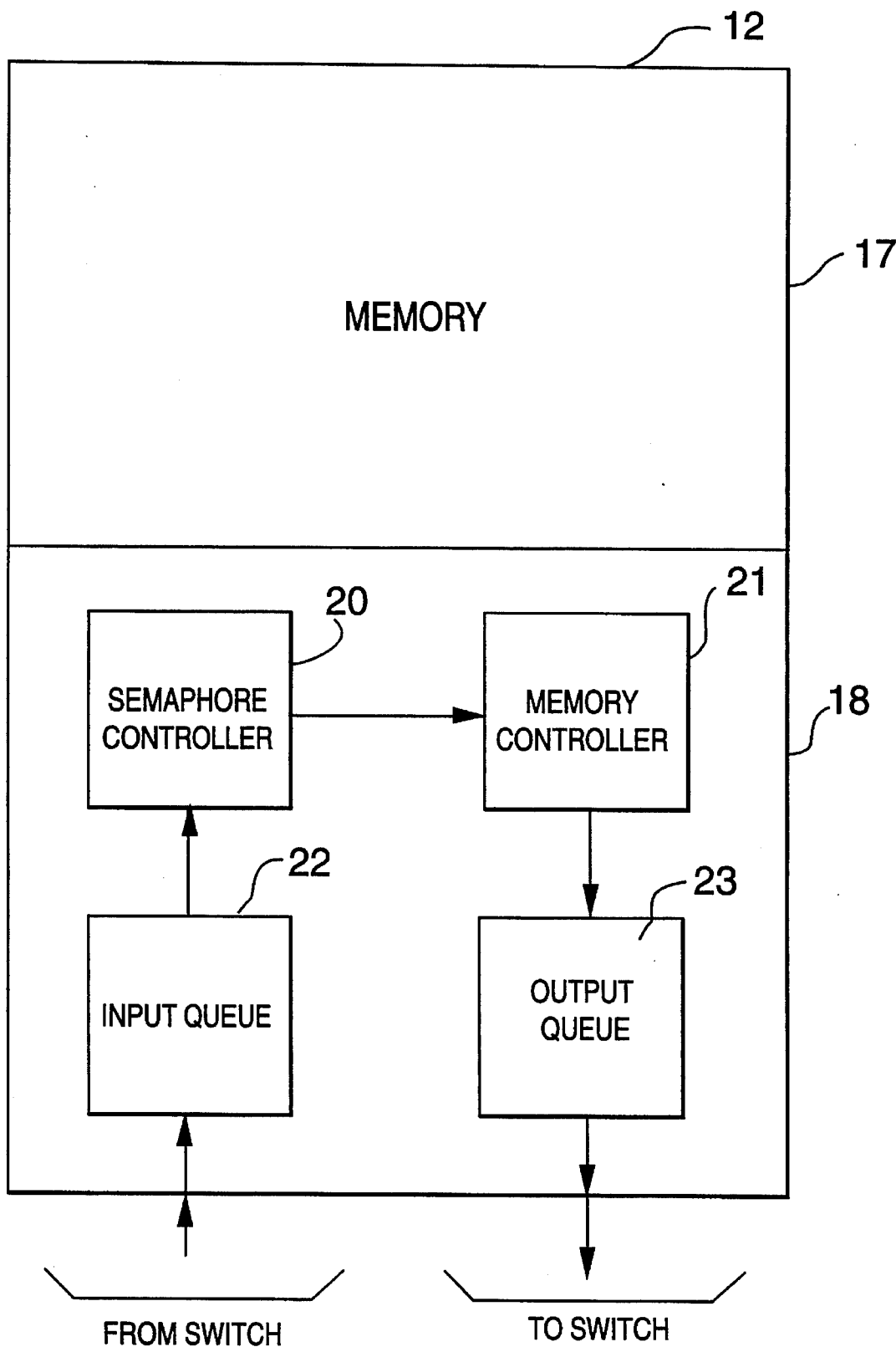
FIG. 2 is a block diagram of a memory module as shown in FIG. 1.
Figure 3:
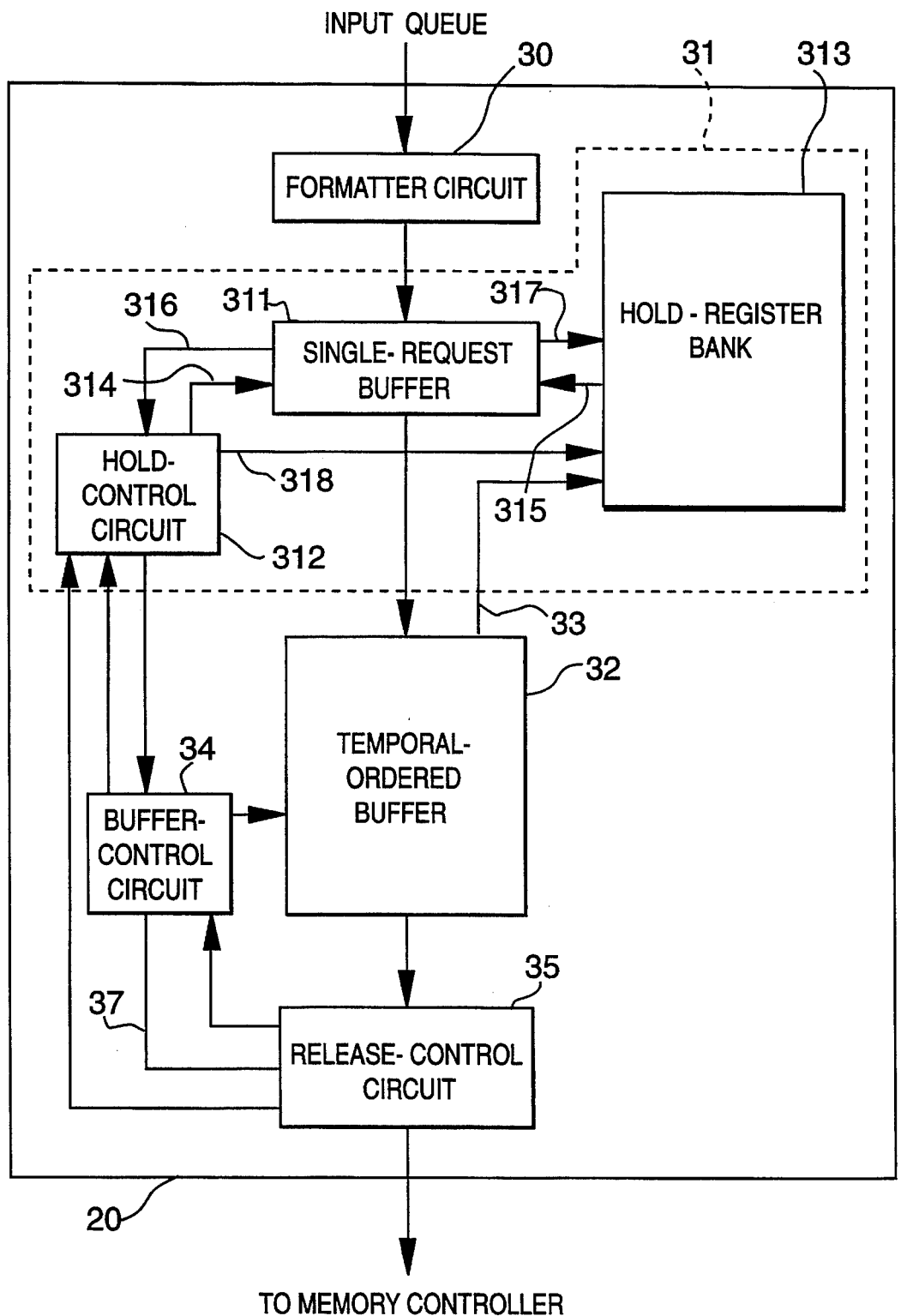
FIG. 3 is a circuit block diagram of a semaphore controller shown in FIG. 2.
Figure 4:
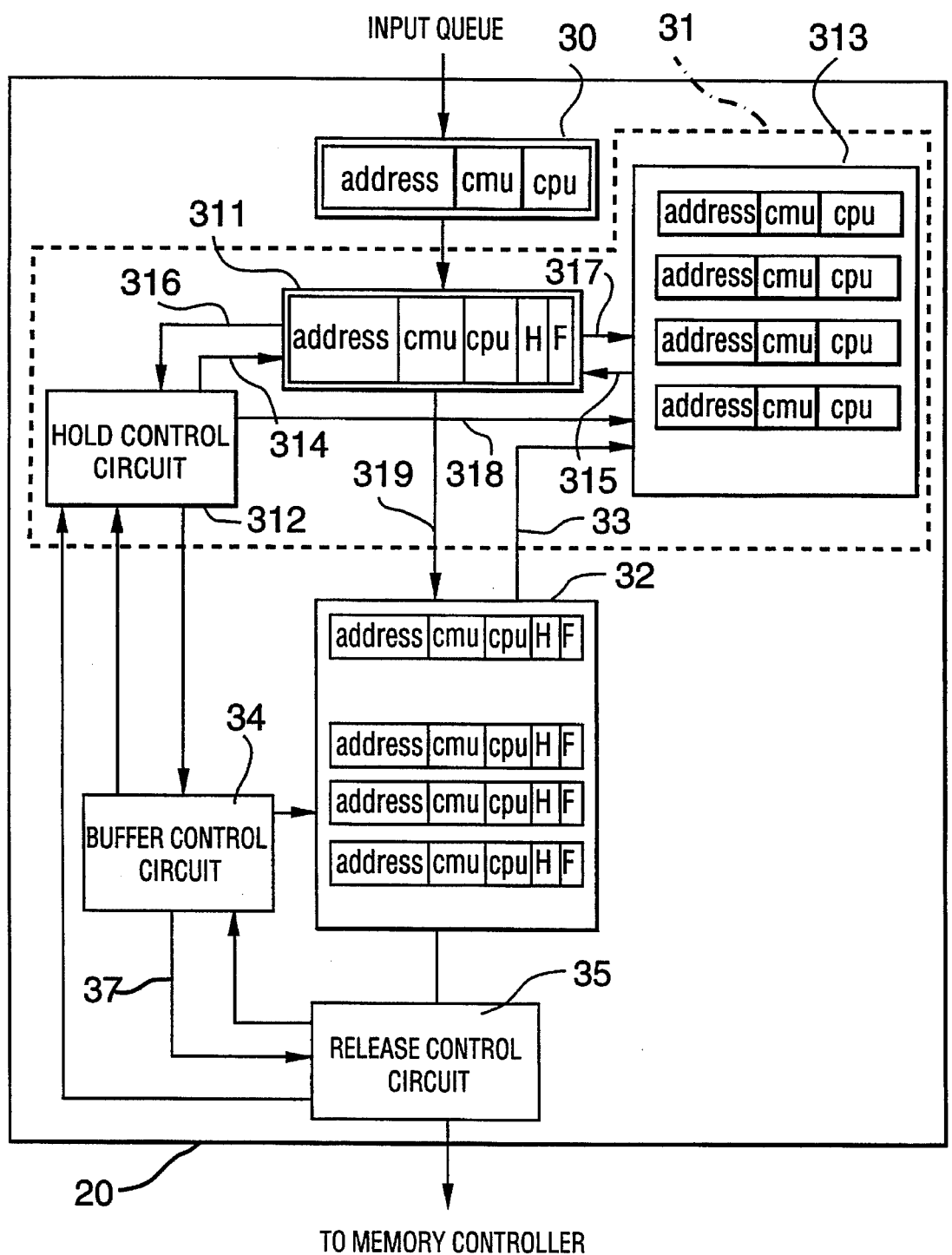
FIG. 4 is a circuit block diagram of the semaphore controller shown in FIG. 3 and illustrating command and tagging fields.

FIG. 3, which is a block diagram of the semaphore controller 20 shows a formatter circuit 30 adapted to receive and format commands from the input queue 22 including memory access requests. The formatter circuit 30 provides a tagger circuit 31 with a single formatted request word containing only relevant data bits required by that circuit for request processing. The tagger circuit 31 comprises a single-request buffer 311, a hold-control circuit 312, and a content addressable hold-register bank 313.

The primary function of the tagger circuit 31 is to compare a single incoming memory request with a plurality of previous requests stored within the hold-register bank 313. The single formatted request in the single-request buffer 311 is tagged by setting a bit in an H-field if it is matched with a corresponding address in the hold-register bank 313. The match of a request address with an address in the hold-register bank 313 corresponds to a conflict with an open semaphore. Open semaphore requests that would be added to the hold-register bank 313 but cannot be added because the hold-register is full, are also tagged by setting a bit in an F-field in the single-request buffer 20. These requests are later added to the hold-register bank 313 when space becomes available. All tagged and untagged requests are temporarily stored in the temporal-ordered buffer 32. Formatted input commands placed in the single-request buffer 311 are passed on to the temporal-ordered buffer 32 having the two additional tag bits concatenated to the original request word. These bits include the tagging information corresponding to either an address match or to a full state of the hold-register bank. The single-request buffer 311 is connected to receive hold-control signals 314 provided by the hold-control circuit 312 and to signals 315 provided by the hold-register bank 313. The hold-register bank 313 and the temporal-ordered buffer 32 are each coupled to the single-request buffer 311 via signal lines 319 and 317 to receive a single request in dependence upon control signals 314 and 318 respectively. The hold-register bank 313 also receives signals from the temporal-ordered buffer 32 via signal lines 33. Both the hold-register bank 313 and the temporal-ordered buffer 32 are content-addressable memory banks. The temporal-ordered buffer can never overflow as it is capable of handling a maximum number of requests, where the maximum number is equal to the number of processors which may access the shared memory. The number of entries in the temporal-ordered buffer 32 is equal to the number of requests outstanding. Each processor 14 is limited to one outstanding request at any given time. Thus there is always space in the temporal ordered buffer for an incoming request. A buffer-control circuit 34 comprised of logic gates has the primary function of sequencing and controlling data stored within the temporal-ordered buffer 32 and provides control signals to the temporal-ordered buffer 32, the hold-control circuit 312, and to a release-control circuit 35. The release-control circuit 35 is a logic circuit adapted to allow access to the shared memory in response to a buffer-control signal 37 and in dependence upon the state of bits stored within the temporal-ordered buffer 32 as explained later. Implementation of the circuit of the invention is within the skill of the ordinary designer once instructed by the present description and may be realized using off the shelf components.

The operation of the circuit will be described in conjunction with FIGS. 1 to 3 and FIG. 4 which illustrate the form of the data format associated with the formatter circuit 30, the hold-register bank 313, the single-request buffer 311 and the temporal-ordered buffer 32. In the instance that a processor 14 requests access to a data structure stored in one of the shared memory modules 12, a request is transmitted to the respective input queue associated with that shared memory module 12. The formatter circuit 30 receives each incoming memory access request in a first-in first-out (FIFO) fashion and converts the request into a condensed request by stripping off unwanted information (such as burst length) not essential to the semaphore controller 20. The removed information is stored in a small random access memory (RAM not shown) along with the processor identification for later processing by the memory controller 21. The memory controller 21 may later access the RAM when the memory access is performed. The condensed format includes three primary information fields. The first of these fields corresponds to the starting address of the block of memory for which access is requested. Each starting address of a requested block typically corresponds to a starting address of a data structure. Memory read and write requests are frequently performed in a burst mode and not in single word mode. Burst mode provides for multiple words to be read from or written to memory as a burst of memory accesses to an entire data structure. The second field includes information related to the type of request. The third field corresponds to the identification number of the particular processor 14 that is requesting access to a data structure stored within the memory 12.

The tagger circuit 31 receives incoming commands from the formatter circuit 30 in the form of memory read or write requests which do not require a semaphore to be opened, memory read and open semaphore requests, memory write requests requiring a semaphore to be closed, and semaphore release requests. A grant of a semaphore related to a data structure provides assurance that other requestors will be excluded access to that data structure or block of memory within a shared memory until the grant is rescinded.

Each incoming formatted request is stored in the single-request buffer 311. Logic circuitry within the hold-control circuit 312 then compares the request start address of the requested block of memory located in shared memory in the single request buffer 311 with all of the addresses in the hold-register bank 313. Each address stored within the hold-register bank 313 has associated with it an open semaphore condition. A processor which has been granted an open semaphore corresponding to a particular block of memory has exclusive access to that block of memory. If the start address in the single request buffer 311 matches one of the addresses in the hold-register bank 313, and the request is a write request corresponding to an open semaphore condition, the single-request buffer is tagged as matched and the hold-control circuit sets a bit in the single request buffer in an "H" bit field representing one of two tag bit fields concatenated to the incoming command. Setting the bit in the "H" bit field corresponds to a condition where a current request in the single-request buffer requires access to a data structure coincident with an open semaphore on the same data structure. When the "H" (hold) bit is set, the buffer-control circuit maintains the current request in the temporal-ordered buffer at least until the open semaphore for the same data structure becomes released, at which time the current request which has been held in abeyance may be processed. When a semaphore becomes released, the corresponding start address of the data structure is removed from the plurality of addresses stored within the hold-register bank 313. If the start address in the single-request buffer 311 does not match with an address in the hold-register bank 313 and the request is a write request corresponding to an open semaphore condition, the request is added to the plurality of addresses stored in the hold-register bank 313 if there is a free register available. In this case, the "H" bit is cleared and the request is forwarded to the temporal-ordered buffer 32. Such a request will not be held in abeyance in the temporal-ordered buffer 32 but will be processed by the buffer-control circuit 34 in first-in first-out (FIFO) order along with other requests of the same class. In general, write requests generated by any requesting processor are to be preceded by an exclusive access request corresponding to an open semaphore condition, copying the request into the hold-register bank 313 so that all write requests have been cleared by the mechanism heretofore described, for accessing the data structure. The assumption of a preceding exclusive access request simplifies the hardware significantly because all write requests can be allowed through to the temporal-ordered buffer 32 instead of only the write requests belonging to the processor holding the semaphore that controls a particular data structure.

All memory read and semaphore requests in the single-request buffer 311 are compared against the addresses currently in the hold-register bank 313. If an address match is found (indicating an open semaphore for the data structure associated with that address), the "H" bit for that request is set and the request is forwarded to the temporal-ordered buffer 32 where it is temporarily held.

If the hold-register bank 313 is full of valid entries, and there is no available register, an open semaphore request in the single-request buffer 311 is passed on to the temporal-ordered buffer 32 and the second tag bit denoted by "F" is set, indicating that the request must be held in abeyance at least until a free register is available in the hold-register bank 313. When a register becomes available, the request is added to the plurality of addresses stored within the hold-register bank 313 thus opening a new semaphore.

The temporal-ordered buffer 32 performs buffering on the following classes of requests memory read requests not requesting semaphores but in conflict with open semaphores in the hold-register bank 313 and waiting for the semaphore to be released; semaphore requests which must be added to the stored addresses corresponding to semaphore requests stored within the hold-register bank but which cannot be added to the hold-register bank 313 because an open semaphore requesting the same address block exists; semaphore requests which may not be added to the semaphore requests stored within the hold-register bank as the hold-register bank is temporarily full; and commands which may be processed and granted memory access by the release-control circuit 35, one at a time in a FIFO order.

Requests residing in the temporal-ordered buffer 32 may only be released by the release-control circuit 35 which clears the hold bit. The overall condition for grant of access to a data structure is that the request has both tag bits cleared. Requests within the temporal-ordered buffer 32 are selected and then extracted by the release-control circuit 35 one at a time and forwarded to the memory controller 21 if the tag bits are cleared. The memory controller 21 upon receiving the request in the form of a word comprising the address field of the requested data structure, the associated processor's identification number, and the type of memory command to be executed, performs the action associated with that request.

The release semaphore command is the only hold related command which is not handled by the hold-control circuit 312. The release semaphore command is handled after the commands come out of the temporal-ordered buffer 32 by the release-control circuit 35 in order to avoid sequencing problems. If the release was handled by the hold-control circuit 312, a command such as a release command included in the same command as a write command may result in a protected data structure having an open semaphore associated with it, being read. Coincident with the release of an open semaphore is the removal of the respective request from the hold register bank 313. Typically, when a pending open semaphore request is waiting in the temporal-ordered buffer 32, and a semaphore associated with the same data structure has been released, the pending semaphore request is stored with the other addresses within the hold-register bank 313 and the "H" bit in the temporal-ordered buffer 32 is cleared. Thus, the temporal-ordered buffer provides a mechanism to temporarily store requests until conditions are met for them to be granted. The temporal-ordered buffer further provides a means of eliminating polling by processors awaiting a grant. When memory access to the data structure is not prohibited due to an open semaphore or to a full hold register bank 313, the request is processed in a first-in first-out order.

It should be realized that the circuit of the invention including the tagger circuit 15, but excluding the temporal ordered buffer 32, may be advantageous in a system where processors provide for polling the semaphore controller circuit 20.

Of course the invention is not limited to the environment of a telecommunications system but could be used in other data handling systems wherein exclusive access by a processor to a data structure is required.

Numerous other modifications, variations and adaptations may be made to the particular embodiment of the invention described above without departing from the scope of the claims.

What is claimed is:

1. In a data handling system having a plurality of processors each capable of accessing a shared memory containing discrete data structures, a method of controlling the exclusive access to a data structure within the shared memory by only one of the processors at a time, the method comprising the steps of:

(a) storing a plurality of addresses in a memory bank, each address being a starting address of a data structure and corresponding to an open atmosphere;

(b) comparing the starting address of a requested data structure with the plurality of stored addresses, a match corresponding to an open semaphore for the requested data structure;

(c) setting a first tag bit in a designated bit field associated with the starting address of the requested data structure thereby tagging the memory request to indicate the presence of an open semaphore if the starting address of the requested data structure matches an address in the memory bank;

(d) setting a second tag bit in an other designated bit field associated with the starting address of the requested data structure to indicate a full bank of stored addresses if a semaphore is required for the requested data structure;

(e) unsetting the first tag bit of the starting address corresponding to any requested data structures if no semaphore is required for that requested data structure and if no open semaphore for that requested data structure exists within the memory bank;

(f) storing the tagged starting addresses of requested data structures in a temporal ordered buffer;

(g) granting memory access in an ordered manner to any of the buffered requests whose starting addresses are stored in the temporal ordered buffer, any request being granted only if neither of the tag bits associated therewith is set;

(h) storing the starting address residing within the temporal ordered buffer in the memory bank and unsetting the first and second tag bits of the starting address within the temporal ordered buffer for the corresponding request if a semaphore is required and if the memory bank is not full and if no open semaphore exists within the memory bank for the requested data structure;

(i) unsetting the first tag bit of the starting address corresponding to any request within the temporal ordered buffer if no semaphore is required for that request and if no open semaphore exists within the memory bank; and (j) repeating steps (g).

2. In a data handling system having a plurality of processors each capable of accessing discrete data structures within a shared memory, a circuit for controlling the exclusive access to a data structure within the shared memory by only one of the processors at a time to any of the data structures within the shared memory, the circuit comprising:

a memory bank for storing a plurality of addresses, each address being a starting address of a data structure and corresponding to an open semaphore;

means for comparing the starting address of a requested data structure with the addresses in the memory bank to determine the presence of an open semaphore for the requested data structure;

control logic circuit for storing the starting address of the requested data structure into the memory bank and opening a semaphore if a semaphore is required and if the starting address of the data structure is not in the memory bank;

a temporal ordered buffer for temporarily storing the starting address of the requested data structure, a first tag bit of the starting address being set or unset depending upon whether or not an open semaphore is required and a second tag bit of the starting address being set or unset depending on whether or not the starting address is in the memory bank;

a buffer control circuit for maintaining a predefined order of the requests within the temporal ordered buffer; and a release control circuit for granting one at a time access to the starting address of the requested data structure in the temporal ordered buffer, the access being granted only if neither of the first or second tag bits of the starting address is set.

3. In a data handling system having a plurality of processors each capable of accessing discrete data structures within a shared memory, a memory management circuit for controlling the exclusive access to a data structure within the shared memory by only one of the processors at a time to any of the data structures within the shared memory, the circuit comprising:

a single request buffer for temporarily storing the starting address of a requested data structure;

a memory bank coupled with the single request buffer for storing data structure starting addresses corresponding to open semaphores;

a hold logic circuit coupled to the single request buffer, the memory bank, and to a buffer control circuit, the hold logic circuit including means for setting first and second tag bits appended to the starting address within the single request buffer, said first tag bit of the starting address being set or unset depending upon whether or not an open semaphore is required and said second tag bit of the starting address being set or unset depending On Whether or not the starting address is in the memory bank and the hold logic circuit further including means for comparing the starting address of the requested data structure in the single request buffer with the addresses stored in the memory bank corresponding to open semaphores;

a temporal ordered buffer for temporarily storing the starting addresses of requested data structures, said temporal ordered buffer responsive to the single request buffer and the buffer control circuit, said buffer control circuit for maintaining a predefined order of the starting addresses with in the temporal ordered buffer; and a release control circuit responsive to the buffer control circuit and to the temporal ordered buffer for granting one at a time access to the starting address of the requested data structure in the temporal ordered buffer, the access being granted only if neither of the first or second tag bits of the starting address is set.

* * * * *